United States Patent
Hall et al.

(10) Patent No.: US 10,625,709 B2
(45) Date of Patent: Apr. 21, 2020

(54) SEAT BELT RETRACTOR ASSEMBLY

(71) Applicant: AUTOLIV ASP, INC., Ogden, UT (US)

(72) Inventors: Christopher D. Hall, Clay Township, MI (US); Jon E. Burrow, Ortonville, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 15 days.

(21) Appl. No.: 16/132,833

(22) Filed: Sep. 17, 2018

(65) Prior Publication Data

US 2020/0086825 A1 Mar. 19, 2020

(51) Int. Cl.
*B60R 22/36* (2006.01)
*B60R 22/34* (2006.01)
*B60R 22/28* (2006.01)

(52) U.S. Cl.
CPC ............ *B60R 22/341* (2013.01); *B60R 22/36* (2013.01); *B60R 2022/287* (2013.01)

(58) Field of Classification Search
CPC .. B60R 22/36; B60R 22/341; B60R 2022/287
See application file for complete search history.

(56) References Cited

U.S. PATENT DOCUMENTS

| | | | |
|---|---|---|---|
| 5,626,306 A | 5/1997 | Miller, III et al. | |
| 6,299,091 B1* | 10/2001 | Blackadder | B60R 22/3413 242/371 |
| 7,686,243 B2* | 3/2010 | Jabusch | B60R 22/3413 242/379.1 |
| 9,688,237 B2 | 6/2017 | Ijiri | |
| 2011/0303780 A1* | 12/2011 | Maekubo | B60R 22/3413 242/379.1 |
| 2012/0234958 A1 | 9/2012 | Stroik, Jr. | |
| 2018/0170305 A1* | 6/2018 | Sato | B60R 22/3413 |

* cited by examiner

*Primary Examiner* — Sang K Kim
(74) *Attorney, Agent, or Firm* — Dickinson Wright PLLC

(57) ABSTRACT

A seat belt retractor for use with a seat belt webbing includes a spindle, a tread head part, a torsion bar, a stop nut and an energy management element. The spindle is configured for winding the seat belt webbing around the spindle. The tread head part is configured for having a locked condition or a free condition. The torsion bar is engaged with the spindle and the tread head part and configured to deflect torsionally by allowing relative rotation between the spindle and the tread head part when the tread head part is in the locked condition. The stop nut is operatively coupled with the tread head part and the spindle and configured to move in axial direction. Furthermore, the energy management element placed between the stop nut and the tread head part is configured to be deformed by the axial movement of the stop nut.

17 Claims, 7 Drawing Sheets

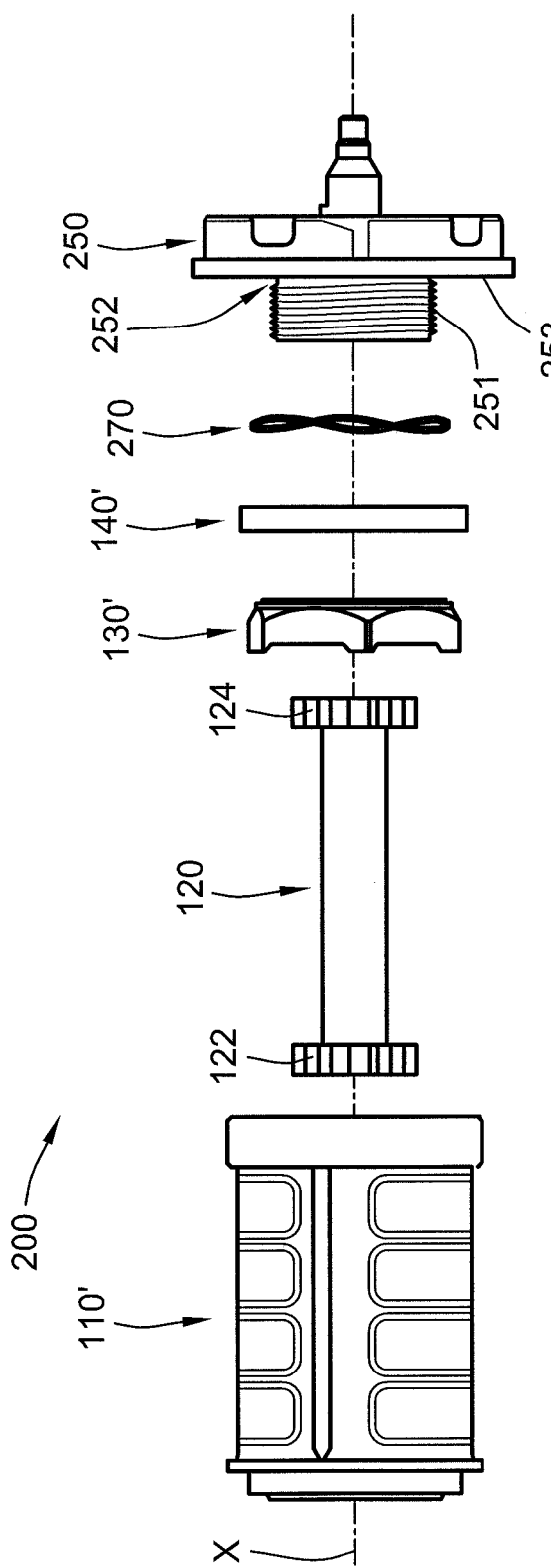
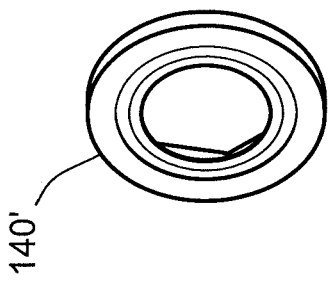
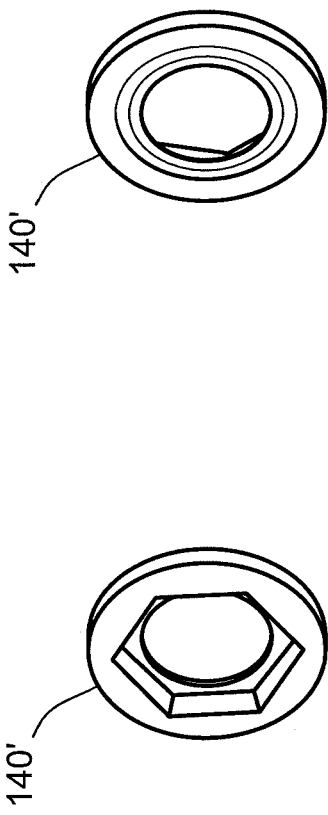
FIG. 6A
FIG. 6B
FIG. 6C

SEAT BELT RETRACTOR ASSEMBLY

FIELD

The present invention relates to a seat belt retractor assembly for use with a vehicle, and particularly to a seat belt retractor with an energy management element.

BACKGROUND

This statements in this section merely provide background information related to the present disclosure and may not constitute prior art. A seat belt system for a vehicle typically includes a seat belt retractor with a seat belt webbing. Generally, the seat belt webbing is winding-up or coming out from the seat belt retractor. The seat belt maintains a relatively low level force on a vehicle occupant tending to pull him back into the vehicle seat in a comfortable manner, but allowing him to move forward to adjust a Global Positioning System (GPS) or a car radio and so forth. Accordingly, during normal driving conditions, the seat belt retractor does not restrict the freedom of movement by wearing the seat belt. An acceleration sensor detects acceleration or deceleration above a predetermined level as an indication of an emergency such as a collision, and locks the seat belt retractor against the further payout of the seat belt webbing to securely restrain the vehicle occupant in the vehicle seat.

Modern seat belt systems include an energy absorption feature to absorb or reduce the kinetic energy of the seat belt system. Accordingly, the seat belt system with the energy absorption feature allows some controlled payout of the seat belt webbing before it is fully locked, so as to more gradually decrease the momentum of the vehicle occupant. By reducing the kinetic energy of the seat belt with the energy absorption feature of the seat belt retractor, such as by slowing a pay-out rate or the seat belt and/or reducing a force applied to the seat belt may provide improved performance.

The above information disclosed in this Background section is only for enhancement of understanding of the background of the present disclosure and therefore it may contain information that does not form the prior art that is already known to a person of ordinary skill in the art.

SUMMARY

The present disclosure generally provides a seat belt retractor assembly. The seat belt retractor assembly includes a seat belt retractor for use with a seat belt webbing. According to one aspect of the present disclosure, the seat belt retractor includes a spindle, a tread head part, a torsion bar, a stop nut and an energy management element. The spindle is configured to wind the seat belt webbing around the spindle. The tread head part is configured to have a locked condition or a free condition. The torsion bar is operatively coupled between the spindle and tread head part, and configured to deflect torsionally by allowing relative rotation between the spindle and the tread head part when the tread head part is in the locked condition. A stop nut is operatively coupled with the tread head part and the spindle and the stop nut is configured to move in an axial direction when the spindle is rotated relative to the tread head part in the locked condition of the tread head part. Furthermore, the energy management element is operatively coupled between the tread head part and the spindle, and the stop nut deforms the energy management element upon the movement in the axial direction thereby resisting the relative rotation between the tread head part and the spindle for controlling a force exerted by the seat belt webbing.

The tread head part is a cylindrical shape with a step portion that is concentric with the spindle. The step portion of the tread head part is extended inside the spindle and has an external thread portion engaged with the stop nut. The stop nut is concentric with the spindle and the stop nut has an internal thread portion for being screwed with the external thread portion of the tread head part. The stop nut is engaged with the spindle and the engaged stop nut is configured to rotate together with the spindle when the tread head part is in the locked condition. The rotation of the stop nut with the spindle relative to the tread head part is configured for allowing the stop nut to move axially toward a base end of the tread head part. In addition, the stop nut has squared-shape teeth projected radially outward on an outer periphery and the squared-shape teeth is fitted into the spindle.

The torsion bar is placed inside the spindle with a cylindrical shape, and the torsion bar is coaxially engaged with the spindle at a first end of the torsion bar and engaged with the tread head part at a second end of the torsion bar. The torsion bar is configured to absorb energy by allowing the relative rotation between the spindle and the tread head part when the tread head part is in the locked condition.

The energy management element is a ring shape being concentric with the spindle and placed between the stop nut and the tread head part. The stop nut deforms the energy management element for progressively increasing a clamping force between the stop nut and the tread head part when the spindle is rotated a predetermined number of times relative to the tread head part in the locked condition of the tread head part. The deformed energy management element is configured for causing it to expand radially into increasing contact for friction interaction between the stop nut and the tread head part. In addition, the energy management element is also configured to increase the resistance to the seat belt webbing extraction while the relative rotation of the spindle with regard to the tread head part is controlled by the torsion bar in the locked condition of the tread head part.

According to another aspect of the present disclosure, the tread head part includes a tread head and a tread head insert. Each of the tread head and the tread head insert is a cylindrical shape and concentric with the spindle. Both are also coaxially engaged each other. The tread head has inner bore teeth in an inner bore, and cavities on an outer periphery. The cavities are configured for allowing the seat belt retractor to move in the locked condition or the free condition by coupling with the locking system. The tread head insert has outer teeth and the outer teeth of the tread head insert is pressly fitted into the inner bore of the tread head for allowing no relative rotation between the tread head insert and the tread head. The tread head and the tread head insert are made of different materials.

Further areas of applicability will become apparent from the description provided herein. Everyone should understand that the description and specific examples presented herein are for the purpose of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 6A is an exploded view of the seat belt retractor according to a second embodiment of the present disclosure;

FIGS. 6B and 6C shows a detailed view on each side of the energy management element with a ring wedge shape.

Figure 1:
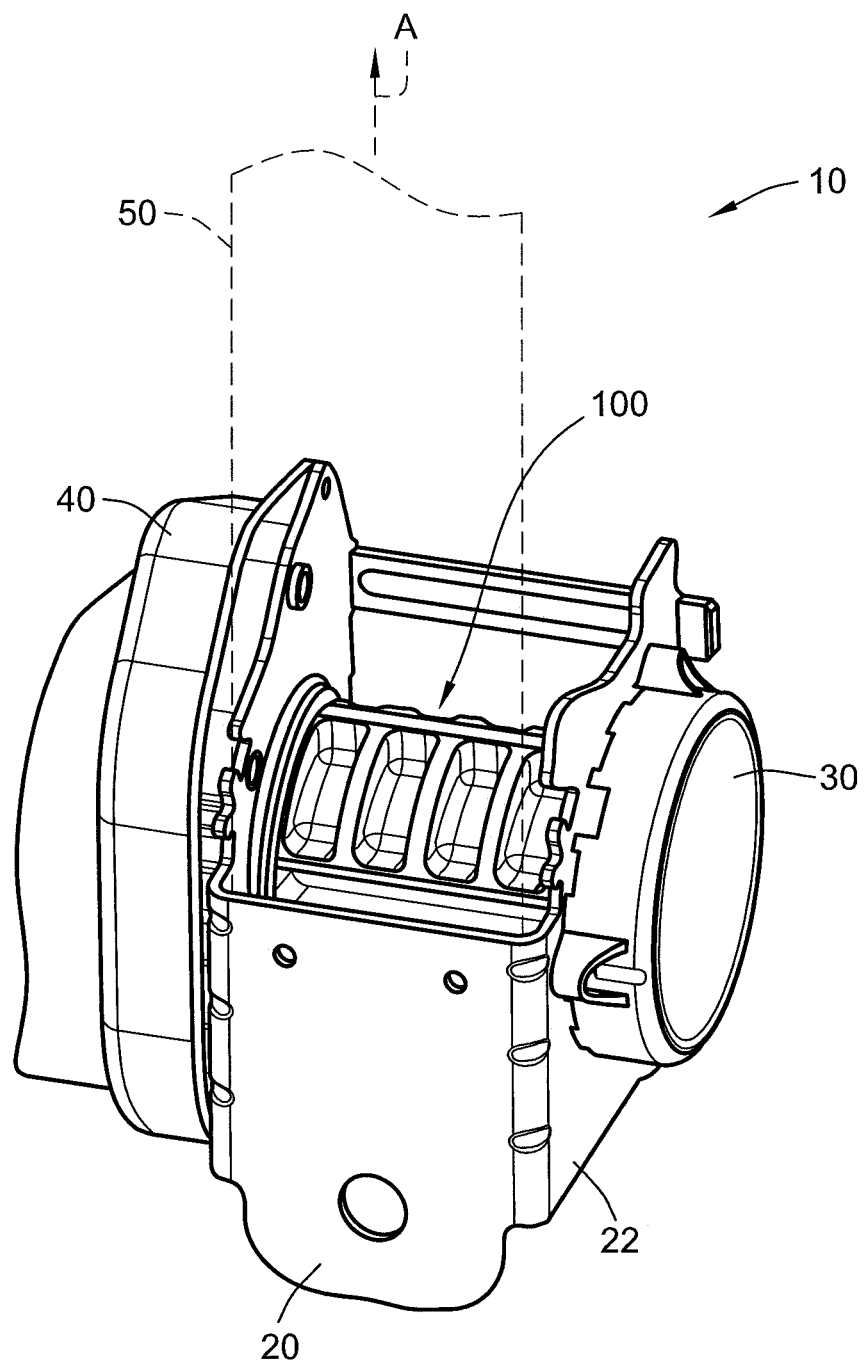
FIG. 1 is a perspective view of a seat belt retractor assembly for use an occupant restraint system in accordance with the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

The present disclosure relates to a seat belt retractor assembly for a seat belt webbing restraint system. The present disclosure is applicable to various retractor constructions and is applicable to various webbing restraint system configurations. During operation of a vehicle, for example, an occupant of the vehicle sits on a seat and a length of seat belt webbing is extensible about the vehicle occupant.

FIG. 1 is a perspective view showing an external appearance of a seat belt retractor assembly 10. As shown in FIG. 1, the seat belt retractor assembly 10 is a device for providing for retraction and extraction of a seat belt webbing 50. The seat belt retractor assembly 10 has a housing 20 which is adapted to be mounted to a portion of the vehicle. The housing 20 is generally U-shaped in planar view and a pair of opposed sides 22. The seat belt retractor assembly further includes a rewind spring system 30, a locking system 40 and a seat belt retractor 100.

Figure 2:
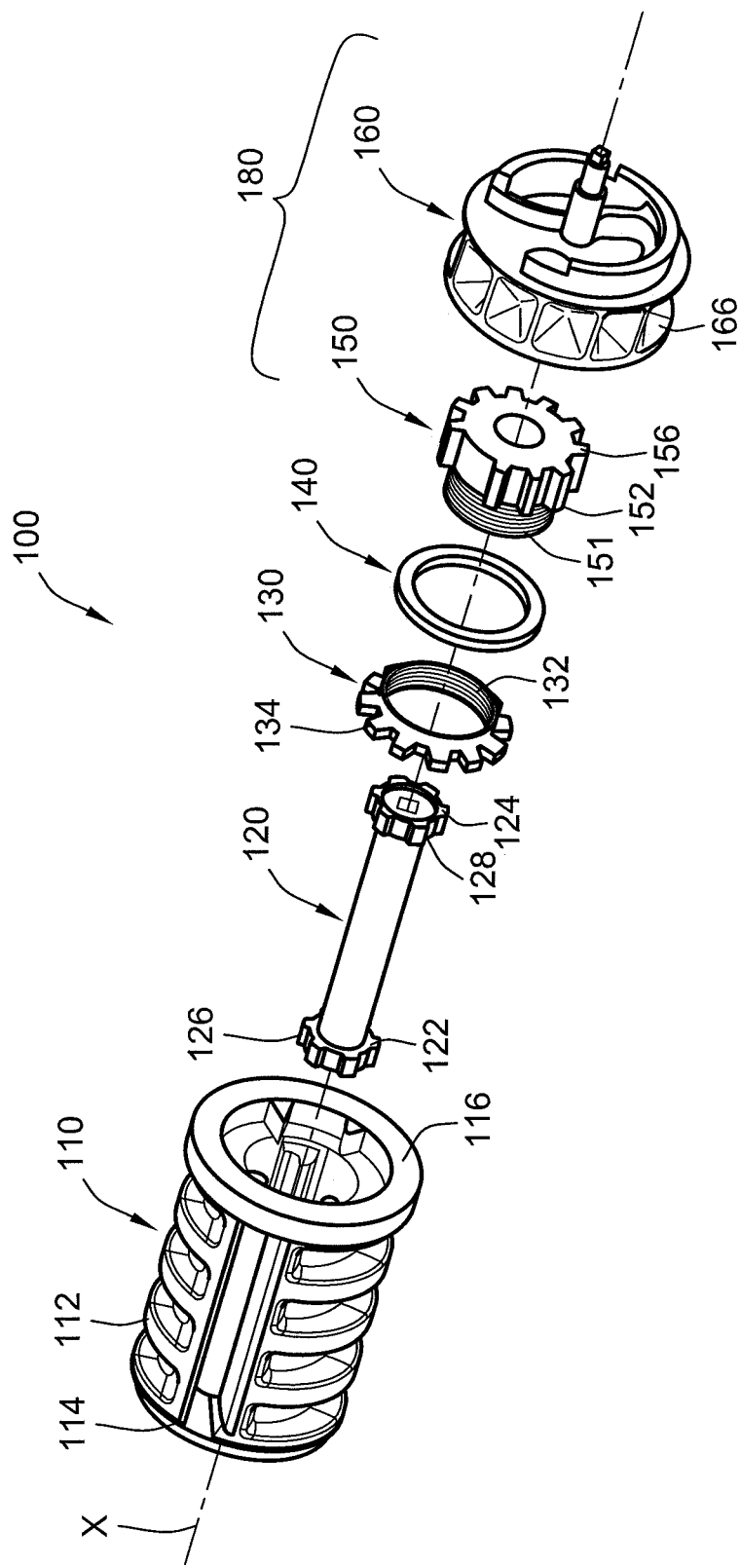
FIG. 2 is an exploded view of a seat belt retractor according to a first embodiment of the present disclosure.
Figure 3:
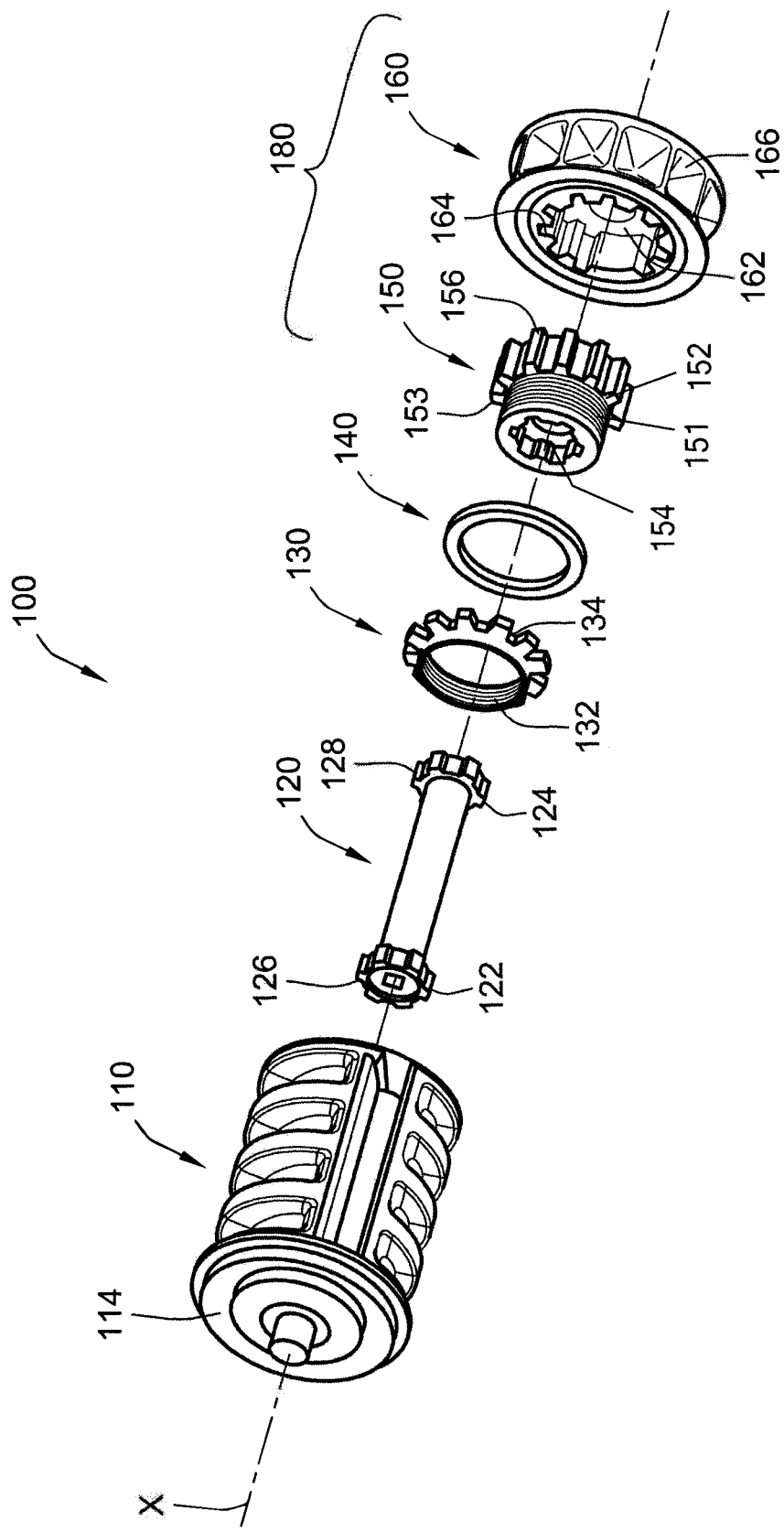
FIG. 3 is an exploded view of the seat belt retractor according to the first embodiment of the present disclosure.

A schematic configuration of the seat belt retractor 100 according to the first embodiment will be described based on FIGS. 2, 3, 5A and 5B. Each of FIGS. 2 and 3 shows an exploded view of the seat belt retractor 100. As illustrated in FIGS. 2 and 3, the seat belt retractor 100 includes a spindle 110, a torsion bar 120, a stop nut 130, an energy management element 140 and a tread head part 180.

As shown in FIGS. 1 and 2, the spindle 110 is formed in a cylindrical shape and is supported by the housing 20 to allow rotation of the spindle 110 about a pivot axis X relative to the housing 20. The seat belt webbing 50 is configured to wind about and pay out from the spindle 110, such as an exterior surface 112 of the spindle 110, when the spindle 110 is rotated relative to the housing 20 of the seat belt retractor assembly 10. For example, the seat belt webbing 50 is extracted or unwound from the spindle 110 when the spindle 110 is rotated in a seat belt webbing pay-out direction A, and the seat belt webbing 50 is retracted or wound around the spindle 110 when the spindle 110 is rotated in a seat belt webbing winding direction.

As shown in FIGS. 2 and 3, the spindle 110 includes a first side 114 and a second side 116. The first side 114 of the spindle 110 is configured for operatively coupling with the torsion bar 120 and the second side 116 of the spindle 110 is configured for operatively coupling with the stop nut 130. Accordingly, the torsion bar 120 is placed inside the spindle 110 for coupling with the first side 114 of the spindle 110. In addition, the spindle 110 is generally made by materials such as an aluminum or zinc die-casting, a molded plastic or a steel, etc.

FIGS. 2 and 3 also illustrate the tread head part 180. The tread head part 180 is operatively coupled to the locking system 40 (shown in FIG. 1) for having a locked condition or a free condition. The tread head part 180 includes a tread head insert 150 having a step portion 152. The tread head insert 150 may be a cylindrical shape being concentric with the spindle 110, and operatively coupled with the spindle 110. The step portion 152 of the tread head insert 150 may be extended inside the spindle 110 and threaded for engaging with the stop nut 130. An external thread portion 151 may be configured to be screwed with an internal thread portion 132 of the stop nut 130, for all the length in axial direction on the outer periphery of the step portion 152. Furthermore, on the inner periphery, the tread head insert 150 has an engagement bore 154 formed to have the similar cross-sectional shape to a second end 124 of the torsion bar 120 for inserting into the engagement bore 154 of tread head insert 150. A second teeth 128 on the second end 124 may be press-fitted into the engagement bore 154 of the tread head insert 150. The tread head insert 150 may be formed of a steel material such as a hard steel. However, other suitable materials may be implemented according to other forms of the present disclosure.

As shown in FIGS. 2 and 3, the tread head part 180 further includes a tread head 160. The tread head 160 may be a cylindrical shape and concentric with the spindle 110. The tread head 160 may be placed between the tread head insert 150 and the locking system 40, and configured for operatively engaged with the tread head insert 150 and the locking system 40 (shown in FIG. 1). The cylindrical tread head 160 has semi spherical cavities 166 on the outer periphery of the tread head 160 for interaction with ball masses of typical pyrotechnic roto pretensioner system (not illustrated). The cavities 166 of the tread head 160 is configured to engage with the locking system 40 (shown in FIG. 1). The tread head 160 of the seat belt retractor 100 is configured to allow the seat belt retractor 100 to move in the locked condition and the free condition. When in the locked condition, the engaged cavities 166 with the locking system 40 (shown in FIG. 1) prohibits rotation of the tread head part 180 relative to the housing 20. When in the free condition, the cavities 166 may not engage with the locking system 40 (shown in FIG. 1) and thus the seat belt retractor 100 may freely rotate. Furthermore, the tread head 160 has an inner bore 162 and the inner bore 162 includes inner bore teeth 164. The inner bore 162 is configured for allowing the tread head insert 150 to be inserted into the inner bore 162 of the tread head 160.

As shown in FIGS. 2 and 3, the tread head insert 150 has outer teeth 156 on the outer periphery. The outer teeth 156 of the tread head insert 150 may be engaged with the inner bore teeth 164 of the tread head 160. Accordingly, the engagement between the outer teeth 156 and the inner bore teeth 164 is configured for allowing no relative rotation between the tread head insert 150 and the tread head 160. The tread head 160 may be formed of a softer material than a material of the tread head insert 150. Accordingly, the tread head 160 and the tread head insert 150 are made of different materials. For example, the tread head 160 may be formed of a casting material softer than the steel material of the tread head insert 150. However, other suitable materials may be implemented according to other forms of the present disclosure.

In the seat belt retractor 100, as shown in FIGS. 2 and 3, the two separated locking assembly such as the tread head insert 150 and the tread head 160 prevents the tread head 160 from separating from the spindle 110 when the stop nut 130 bottoms out against the tread head insert 150. Generally, in case of an emergency such as vehicle collision, if the tread head 160 separates from the spindle 110, the seat belt retractor 100 may not perform properly. Accordingly, the seat belt retractor 100 in the present disclosure can prevent the failure of the seat belt retractor assembly 10 in the emergency.

FIGS. 2 and 3 also illustrate the torsion bar 120. The torsion bar 120 is a cylindrical shape and placed inside the spindle 110. The torsion bar 120 has a first end 122 and the second end 124. The torsion bar 120 is configured for controlling the restraint forces acting on the associated seat belt webbing and for absorbing an amount of energy to be exerted to the seat belt retractor 100 by the seat belt webbing 50 (shown in FIG. 1). The first end 122 of the torsion bar 120 is operatively coupled to the first side 114 of the spindle 110, and the second end 124 of the torsion bar 120 is operatively coupled with the tread head insert 150. The first and second ends 122, 124 of the torsion bar 120 respectively has a first teeth 126 and the second teeth 128. The first teeth 126 of the torsion bar 120 is coaxially engaged with the first side 114 of the spindle 110, and the second teeth 128 of the torsion bar 120 is coaxially fitted into the engagement bore 154 of the tread head insert 150. However, other suitable features of the first and second ends 122, 124 of the torsion bar 120 according to other forms of the present disclosure may be implemented for engaging with both the torsion bar 120 and the tread head insert 150 to transmit torque.

FIGS. 2 and 3 further illustrate the stop nut 130 being a ring shape in axial cross section and concentric with the spindle 110. The stop nut 130 has the internal thread portion 132 being configured to be screwed with the external thread portion 151 formed on the step portion 152 of the tread head insert 150. Furthermore, the stop nut 130 has squared-shape teeth 134 projected radially outward, on the outer periphery thereof. The stop nut 130 may be formed to have its thickness dimension in axial direction shorter than the whole length of the step portion 152 of the tread head insert 150 in axial direction by a predetermined length.

The stop nut 130 is configured to be able to move axially outward with respect to the spindle 110. In particular, the stop nut 130 can move axially toward a base end 153 of the tread head insert 150 in axial direction when the spindle 110 has made relative rotation in the seat belt webbing pay-out direction with respect to the tread head insert 150 in case of an emergency such as vehicle collision, described in detail later. The stop nut 130 is operatively engaged with the spindle 110. In particular, the squared-shaped teeth 134 of the stop nut 130 is configured to fit into the second side 116 of the spindle 110. Accordingly, the mechanism of the stop nut 130 stops the relative rotation between the spindle 110 and the tread head insert 150 when the relative rotations of the spindle 110 in the seat belt webbing pay-out direction with regard to the tread head insert 150 reaches a predetermined number of times (for example, 2 or 2.5 turns), in case of an emergency such as vehicle collision.

As shown in FIGS. 2 and 3, the seat belt retractor 100 further includes an energy management element 140 being a ring shape in axial cross section. However, the other suitable shapes according to other forms of the present disclosure may be implemented. The energy management element 140 may be operatively coupled between the tread head part 180 and the spindle 110. In accordance with an exemplary form of the present disclosure, the energy management element 140 is placed between the stop nut 130 and the tread head insert 150. The energy management element 140 is configured for acting with the torsion bar 120 for controlling a force exerted by the seat belt webbing 50 (shown in FIG. 1) in case of an emergency such as vehicle collision.

The energy management element 140 may be formed by a steel. However, other suitable materials according to other forms of the present disclosure may be implemented. The stop nut 130 deforms the energy management element 140 upon the movement in the axial direction, thereby resisting the relative rotation between the spindle 110 and the tread head insert 150. The energy management element 140 is configured to make the relative rotation of the stop nut 130 with regard to the tread head insert 150 stop progressively in case of an emergency such as vehicle collision. Accordingly, the energy management element 140 absorbs the force exerted by the seat belt webbing 50 (shown in FIG. 1) by mechanical deformation. The deformed energy management element 140 is configured to cause it to expand radially into increasing contact for friction interaction between the stop nut 130 and the tread head insert 150. Furthermore, since the energy management element 140 may be formed in small package size such as 2.4 mm thickness in axial direction, the energy management element 140 can be used in the torsion bar 120 with a standard length. However, other suitable sizes may be implemented according to other forms of the present disclosure.

Figure 4:
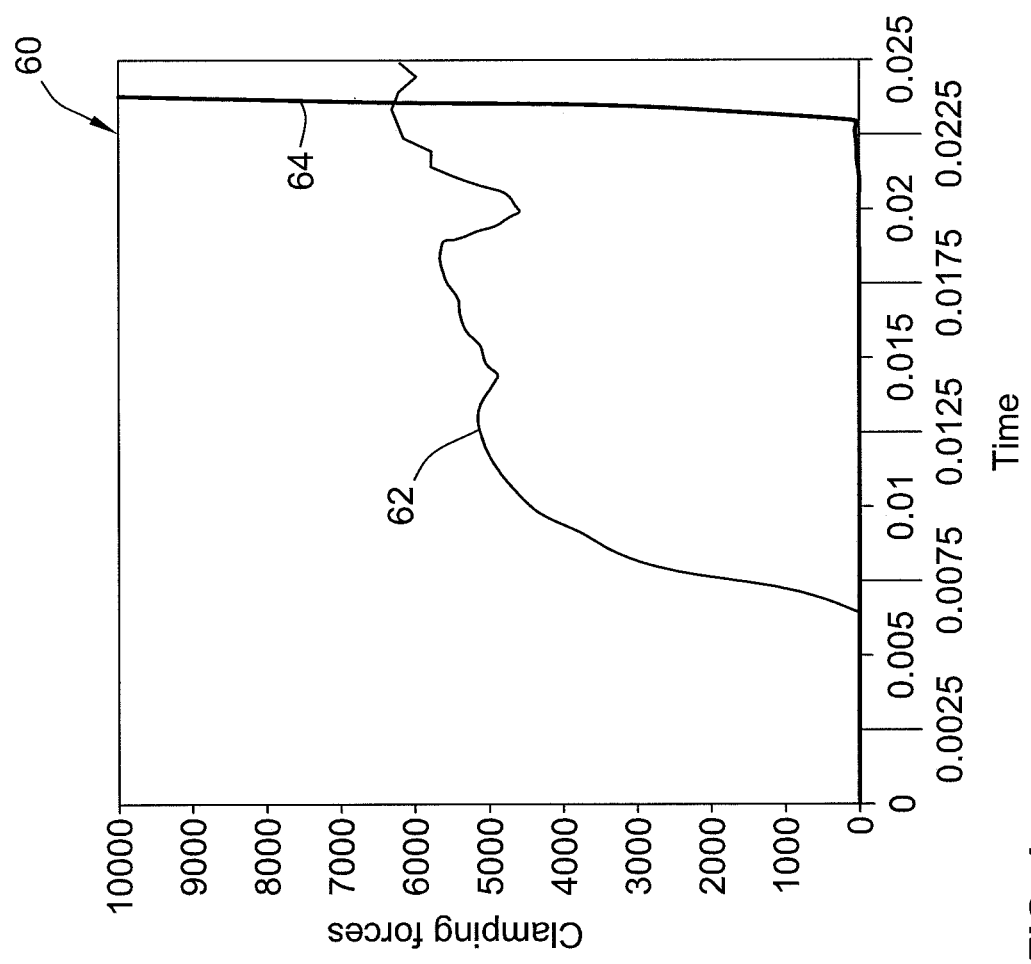
FIG. 4 illustrates a graph of the compared clamping forces between a stop nut and a tread head insert with/without an energy management element.

FIG. 4 shows a graph 60 comparing a clamping force between the stop nut 130 and the tread head insert 150 with or without the energy management element 140 in case of an emergency such as vehicle collision. A fine solid line 62 is the clamping force between the stop nut 130 and the tread head insert 150 when the energy management element 140 is installed between them, and a dark solid line 64 is the clamping force between the stop nut 130 and the tread head insert 150 when the energy management element 140 is not installed. As shown in FIG. 4, the load curve of the dark solid line 64 is very steep such as a spike in a dynamic event when the stop nut 130 comes into contact directly to the base end 153 of the tread head insert 150 without the energy management element 140. However, the load curve of the fine solid line 62 with the installed energy management element 140 can be progressively increased without the sudden spike in the event because the energy management element 140 can absorb the force exerted by the seat belt webbing 50. Accordingly, the energy management element 140 may prevent the usual load spike in the dynamic event, and be configured to progressively increase the clamping forces by the axial movement of the stop nut 130 as shown in the graph 60.

Figure 5A:
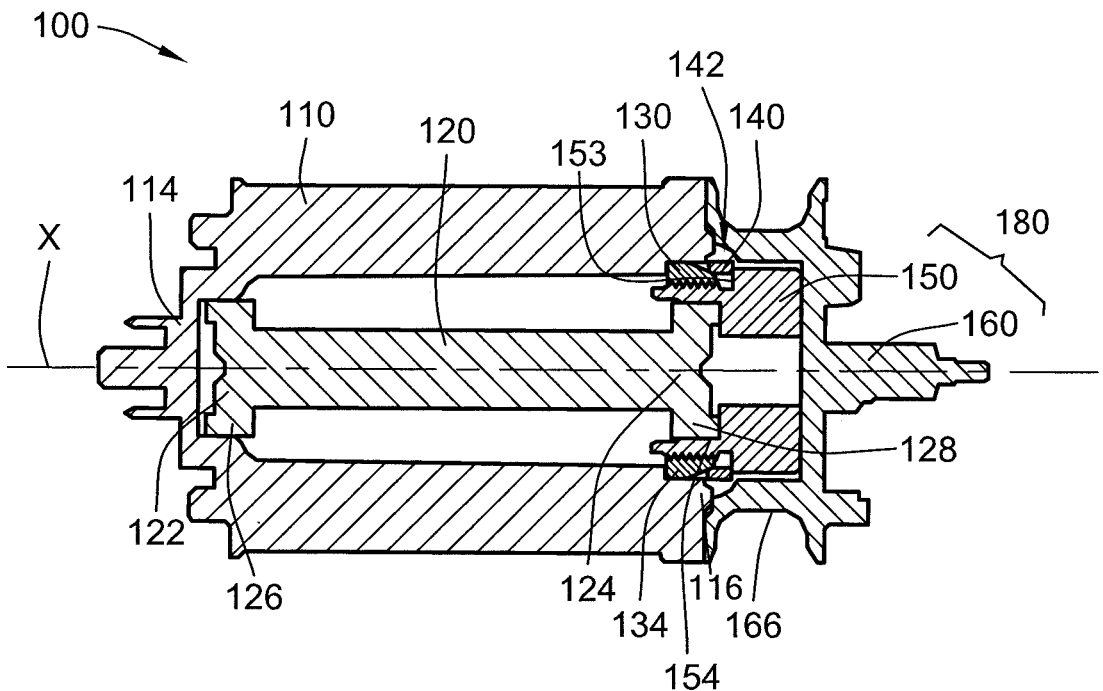
FIG. 5A is a cross-sectional view of the seat belt retractor of FIG. 2 in a normal operation.
Figure 5B:
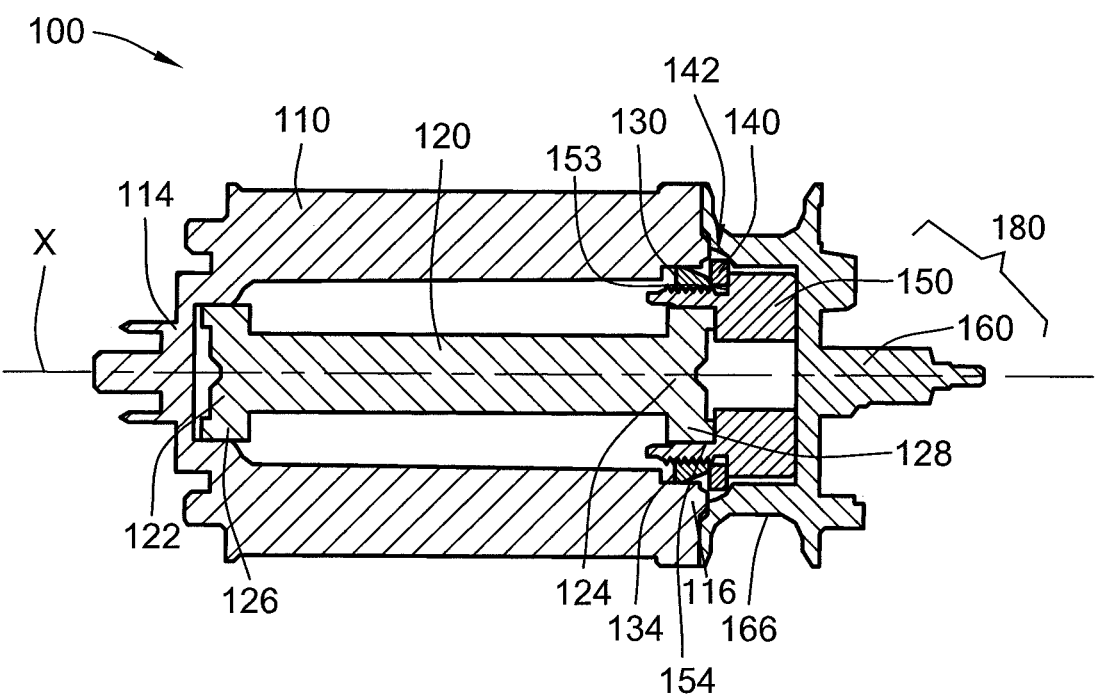
FIG. 5B is a cross-sectional view of the seat belt retractor of FIG. 2 in a state where a stop nut has fastened the tread head insert and the spindle.

FIGS. 5A-5B show cross-sectional views of the seat belt retractor 100 of FIGS. 2 and 3. FIG. 5A shows the seat belt retractor 100 in the free condition, and FIG. 5B shows a state where the stop nut 130 has been fully fastened to the tread head insert 150. As shown FIG. 5A, the seat belt retractor 100 is assembled and has fastened the spindle 110 and the tread head part 180. In case of an emergency such as vehicle collision and the like, the seat belt webbing 50 may be pulled-out in the pay-out direction A. In a case where the spindle 110 is rotated in the seat belt webbing pay-out direction A, the locking system 40 (shown in FIG. 1) gets engaged with the tread head 160 so that the tread head 160 is stopped. Accordingly, the rotation of the tread head insert 150 engaged with the tread head 160 is also stopped.

In a case where an occupant is relatively moved forward with respect to the vehicle when the rotation of the tread head insert 150 engaged with the tread head 160 is stopped, significantly large pull-out force acts on the seat belt webbing 50. In a case where the seat belt webbing 50 is paid out with the pull-out force exceeding a predetermined value corresponding to threshold (for example, 7 KN), rotation torque in the seat belt webbing pay-out direction A acts on the spindle 110.

Since the rotation of the tread head part 180 is stopped (the tread head insert 150 and the tread head 160 are in the locked condition), the rotation of the engaged area between the second end 124 of the torsion bar 120 and the engagement bore 154 of the tread head insert 150 is also stopped in the seat belt webbing pay-out direction A. In addition, the first end 122 of the torsion bar 120 engaged with the first side 114 of the spindle 110 is rotated by rotation torque of the seat belt webbing 50 acting on the spindle 110 in the seat belt webbing pay-out direction A. Accordingly, the torsion bar 120 is deflected torsionally because the engaged first teeth 126 of the torsion bar 120 with the spindle 110 can be rotated and the engaged second teeth 128 of the torsion bar 120 with the tread head insert 150 cannot be rotated. Therefore, the spindle 110 is rotated in the seat belt webbing 50 pay-out direction A along the torsional deformation of the torsion bar 120 whereby the energy is absorbed in the form of the torsional deformation of the torsion bar 120.

Since relative rotation is caused between the tread head insert 150 and the spindle 110, the stop nut 130 is rotated in the seat belt webbing 50 pay-out direction A together with the spindle 110 because the squared-shape teeth 134 of the stop nut 130 is engaged with the second side 116 of the spindle 110. By the relative rotation between the stop nut 130 and the tread head insert 150 including the tread head 160, the internal thread portion 132 of the stop nut 130 is screwed with the external thread portion 151 of the tread head insert 150 and the stop nut 130 is moved toward the base end 153 of the tread head insert 150 in the axial direction X.

In the locked condition of the tread head insert 150 as shown in FIG. 5B, the torsional deformation of the torsion bar 120 reaches certain extent corresponding to the predetermined number of times of rotations (for example, 2 or 2.5 turns), and the stop nut 130 and the tread head insert 150 are fastened in a relatively non-rotatable manner. While the stop nut 130 and the tread head insert 150 are fastening each other, the energy management element 140 placed between the stop nut 130 and the tread head insert 150 is deformed. Accordingly, when the stop nut 130 is moved toward the base end 153 of the tread head insert 150 by the rotational deformation of the torsion bar 120 in the axial direction X, the energy management element 140 is radially expanded to a space 142 between the spindle 110 and the tread head part 180 by the stop nut's 130 axial compression. As shown in FIG. 4, therefore, the clamping force between the stop nut 130 and the tread head insert 150 with the installed energy management element 140 can be progressively increased until the stop nut 130 are fully fastened to the tread head insert 150 without the sudden spike in the dynamic event. In addition, the energy management element 140 is configured to increase the resistance to the seat belt webbing 50 extraction while the relative rotation of the spindle 110 with regard to the tread head part 180 is controlled by the torsion bar 120 in the locked condition of the tread head part 180.

Figure 7:
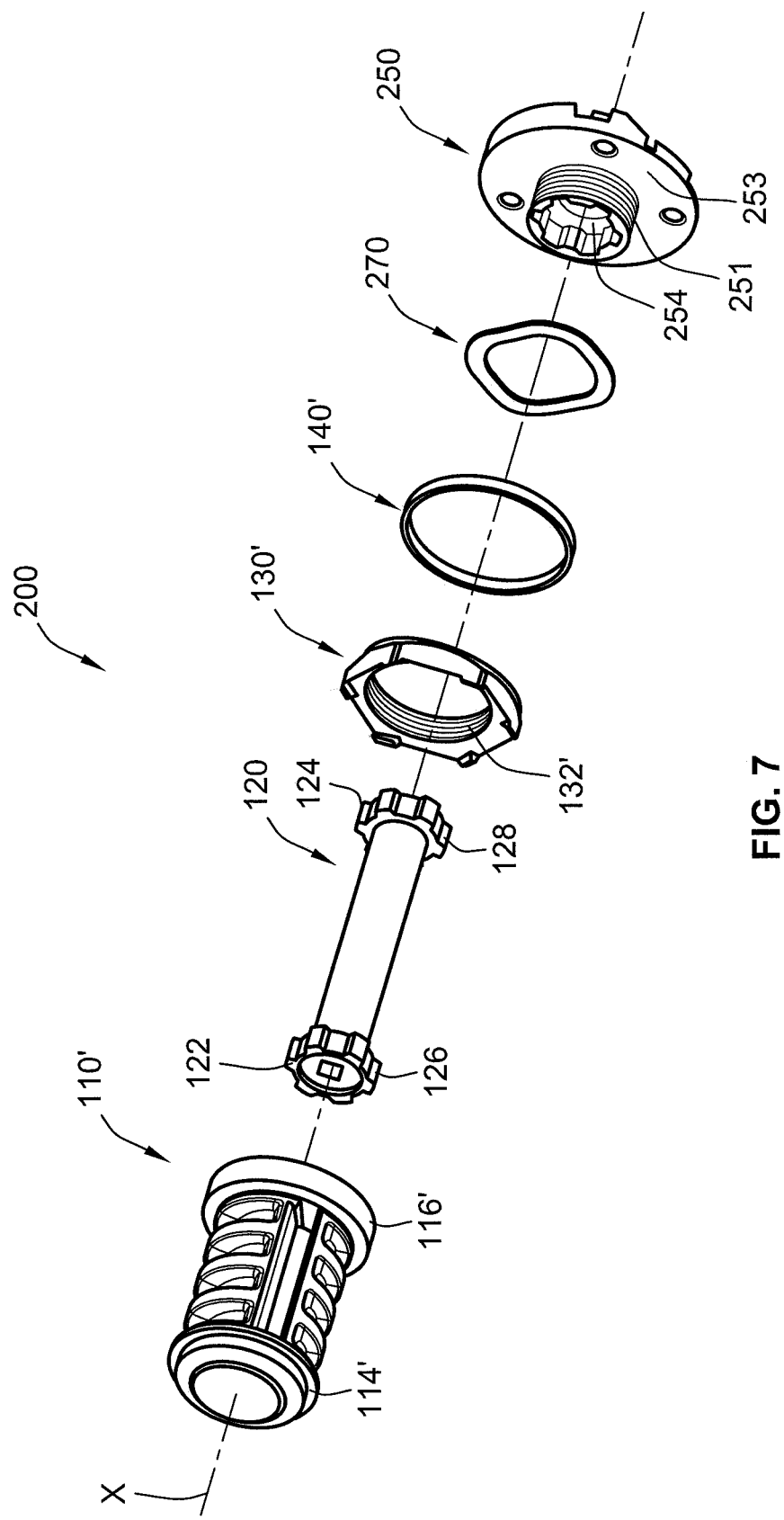
FIG. 7 is an exploded view of the seat belt retractor according to the second embodiment of the present disclosure.

FIGS. 6A and 7 illustrate another form of the present disclosure as a second embodiment. The same parts as in the seat belt retractor 100 are identified with the same reference numerals, and explanation thereof is omitted. As shown in FIGS. 6A and 7, in the second embodiment, the features of the two parts (the tread head insert 150 and the tread head 160) described for the first embodiment are integrated as a second tread head part 250. The second tread head part 250 is engaged directly with the locking system 40 (shown in FIG. 1) for allowing the second seat belt retractor 200 to move between the locked condition and the free condition. In the second embodiment of FIGS. 6A and 7, when in the locked condition (in case of an emergency such as vehicle collision), the locking system 40 prohibits rotation of the second tread head part 250 relative to the housing 20 (shown in FIG. 1). When in the free condition, the locking system 40 allows the second tread head part 250 to freely rotate.

FIGS. 6A and 7 illustrate the second tread head part 250 including a second step portion 252 of the same type shown in FIGS. 2 and 3. The second step portion 252 may be also threaded for engaging with a stop nut 130'. As described in the first embodiment of the present disclosure, the second step portion 252 also has a second external thread portion 251 configured to be screwed with an internal thread portion 132' of the stop nut 130'. Furthermore, on the inner periphery, the second tread head part 250 has a second engagement bore 254 formed to have the similar cross-sectional shape to the second end 124 of the torsion bar 120 for being inserted into the second engagement bore 254 of the second tread head part 250. The second teeth 128 of the torsion bar 120 may be press-fitted into the second engagement bore 254 according to the same way shown in FIGS. 2 and 3. The second tread head part 250 may be also formed of a steel material such as a hard steel. However, other suitable materials may be implemented according to other forms of the present disclosure.

In the second embodiment of FIGS. 6A and 7, the second seat belt retractor 200 may optionally include a spring element 270 having a ring-waved shape. The second seat belt retractor 200 may be assembled with the spring element 270 or without the spring element 270. In the second seat belt retractor 200 including the spring element 270 of an assembled configuration, the spring element 270 may be placed in a gap between an energy management element 140' and the second tread head part 250. The spring element 270 prevents the energy management element 140' from moving axially during normal driving of the vehicle (in the free condition of the second seat belt retractor 200). Accordingly, the spring element 270 is configured to limit vibration noise of the installed energy management element 140' in the free condition of the second seat belt retractor 200. However, the second seat belt retractor 200 can be optionally assembled without the spring element 270.

In the second embodiment of FIGS. 6A and 7, a stop nut 130' may be formed as a hexagonal shape on an outer periphery in axial cross section. The stop nut 130' in this embodiment also has an internal thread portion 132' being configured to be screwed with the second external thread portion 251 formed on the second step portion 252. As shown in FIGS. 6A and 7, the stop nut 130' is also engaged with a spindle 110'. Since the stop nut 130' has the hexagonal shape on the outer periphery thereof, an second side 116' of the spindle 110' may be also formed as a hexagonal shape for being fitted by the stop nut 130'. However, other suitable shapes on the outer periphery of the stop nut 130' and the second side 116' of the spindle 110' in accordance with the other forms of the present disclosure may be implemented.

As shown in FIGS. 6B and 6C, furthermore, the energy management element 140' may have a ring wedge shape on each side of the energy management element 140'. The ring wedge shape may be configured to fit the spring element 270 and the stop nut 130' respectively into the energy management element 140' when they are assembled and operated. However, other suitable shapes of the energy management element 140' can be implemented according to other configurations of the present disclosure.

As shown in FIGS. 6A and 7, the stop nut 130' is configured to be able to move toward a second base end 253 of the second tread head part 250 in axial direction X. As described in the operation of the seat belt retractor 100 above, the stop nut 130' in the second seat belt retractor 200 also deforms the energy management element 140' upon the movement in the axial direction. In an assembled configuration of the seat belt retractor assembly 100 with the spring element 270, in addition to deforming the energy management element 140', the placed spring element 270 is deformed due to the axial movement of the stop nut 130'. Accordingly, as described above, the energy management element 140' is configured to stop progressively the relative rotation of the stop nut 130' with regard to the second tread head part 250 in the locked condition (in case of an emergency such as vehicle collision) by radially expanding itself.

The foregoing description of various forms of the invention has been presented for purposes of illustration and description. It is not intended to be exhaustive or to limit the invention to the precis forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat belt retractor for use with a seat belt webbing, the seat belt retractor comprising:
    a spindle configured to wind the seat belt webbing around the spindle;
    a tread head part configured to have a locked condition or a free condition;
    a torsion bar operatively coupled between the spindle and the tread head part, the torsion bar configured to deflect torsionally by allowing relative rotation between the spindle and the tread head part when the tread head part is in the locked condition;
    a stop nut operatively coupled with the tread head part and the spindle, the stop nut configured to move in an axial direction when the spindle is rotated relative to the tread head part in the locked condition of the tread head part; and
    an energy management element operatively coupled between the tread head part and the spindle, the stop nut deforming the energy management element upon the movement in the axial direction thereby resisting the relative rotation between the tread head part and the spindle for controlling a force exerted by the seat belt webbing.

2. The seat belt retractor of claim 1, wherein the tread head part has a cylindrical shape with a step portion that is concentric with the spindle.

3. The seat belt retractor of claim 2, wherein the step portion of the tread head part is extended inside the spindle and has an external thread portion engaged with the stop nut.

4. The seat belt retractor of claim 3, wherein the stop nut is concentric with the spindle, and the stop nut has an internal thread portion for being screwed with the external thread portion of the tread head part.

5. The seat belt retractor of claim 1, wherein the stop nut is engaged with the spindle and the stop nut is configured to rotate together with the spindle when the tread head part is in the locked condition.

6. The seat belt retractor of claim 5, wherein the rotation of the stop nut with the spindle relative to the tread head part is configured for allowing the stop nut to move axially toward a base end of the tread head part.

7. The seat belt retractor of claim 1, wherein the stop nut has squared-shape teeth projected radially outward on an outer periphery, and the squared-shape teeth is fitted into the spindle.

8. The seat belt retractor of claim 1, wherein the torsion bar is placed inside the spindle with a cylindrical shape, and wherein the torsion bar is coaxially engaged with the spindle at a first end of the torsion bar and engaged with the tread head part at a second end of the torsion bar.

9. The seat belt retractor of claim 1, wherein the torsion bar is configured to absorb energy by allowing the relative rotation between the spindle and the tread head part when the tread head part is in the locked condition.

10. The seat belt retractor of claim 1, wherein the energy management element has a ring shape and is concentric with the spindle and placed between the stop nut and the tread head part.

11. The seat belt retractor of claim 10, wherein the stop nut deforms the energy management element for progressively increasing a clamping force between the stop nut and the tread head part when the spindle is rotated a predetermined number of times relative to the tread head part in the locked condition of the tread head part.

12. The seat belt retractor of claim 10, wherein the deformed energy management element is configured to expand radially into increasing contact for friction interaction between the stop nut and the tread head part.

13. The seat belt retractor of claim 1, wherein the energy management element is configured to increase the resistance to the seat belt webbing extraction while the relative rotation of the spindle with regard to the tread head part is controlled by the torsion bar in the locked condition of the tread head part.

14. The seat belt retractor of claim 1, wherein the tread head part includes a tread head and a tread head insert being a cylindrical shape, and the tread head and the tread head insert are concentric with the spindle and coaxially engaged with each other.

15. The seat belt retractor of claim 14, wherein the tread head has inner bore teeth in an inner bore and cavities on an outer periphery, and wherein the cavities are configured for allowing the seat belt retractor to move in the locked condition or the free condition by coupling to the locking system.

16. The seat belt retractor of claim 15, wherein the tread head insert has outer teeth, and the outer teeth of the tread head insert is press fitted into the inner bore of the tread head for allowing no relative rotation between the tread head insert and the tread head.

17. The seat belt retractor of claim 14, wherein the tread head and the tread head insert are made of different materials.

* * * * *